US012752347B2

(12) United States Patent
Tanaami et al.

(10) Patent No.: US 12,752,347 B2
(45) Date of Patent: Oct. 6, 2026

(54) MOUNTING DEVICE, MOUNTING METHOD, AND METHOD FOR MANUFACTURING PRODUCT

(71) Applicant: SINTOKOGIO, LTD., Nagoya (JP)

(72) Inventors: Yoshikane Tanaami, Nagoya (JP); Miyuki Hayashi, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 0 days.

(21) Appl. No.: 18/804,355

(22) Filed: Aug. 14, 2024

(65) Prior Publication Data

US 2025/0108442 A1 Apr. 3, 2025

(30) Foreign Application Priority Data

Sep. 29, 2023 (JP) ................................ 2023-170381

(51) Int. Cl.
*B23B 31/24* (2006.01)
*B23B 25/06* (2006.01)
*B23B 5/16* (2006.01)

(52) U.S. Cl.
CPC .............. *B23B 31/24* (2013.01); *B23B 25/06* (2013.01); *B23B 5/163* (2013.01); *B23B 2231/26* (2013.01)

(58) Field of Classification Search
CPC .. B23B 5/02; B23B 5/04; B23B 5/163; B23B 13/12; B23B 13/123; B23B 13/125; B23B 13/126; B23B 13/128; B23B 25/06; B23B 31/20; B23B 31/025; B23B 31/24; B23B 2250/08; B23B 2260/128; B23B 2270/48; B23B 2270/483; B23B 2270/486; B23B 2231/12; B23B 2231/14; B23B 2231/26; B23Q 1/50; B23Q 1/76; B23Q 3/152
See application file for complete search history.

(56) References Cited

U.S. PATENT DOCUMENTS

| | | | | |
|---|---|---|---|---|
| 3,388,589 | A | 6/1968 | Campbell | |
| 2004/0187602 | A1 | 9/2004 | Okada | |
| 2011/0006490 | A1 * | 1/2011 | Puppala | B23B 31/19 279/134 |
| 2012/0119451 | A1 * | 5/2012 | Hangleiter | B23B 31/28 29/559 |
| 2017/0129062 | A1 * | 5/2017 | Caldwell | B23K 37/04 |

(Continued)

FOREIGN PATENT DOCUMENTS

| | | | | |
|---|---|---|---|---|
| AT | 520081 B1 | * 1/2019 | | B23Q 1/703 |
| CN | 105033288 A | * 11/2015 | | B23B 23/00 |

(Continued)

OTHER PUBLICATIONS

Office Action dated Aug. 13, 2006 issued in U.S. Appl. No. 18/804,394.

*Primary Examiner* — Nicole N Ramos
(74) *Attorney, Agent, or Firm* — Harness, Dickey & Pierce, P.L.C.

(57) ABSTRACT

A mounting device includes a pressing jig configured to press a turning target against a turning processing device, and to the pressing jig, contact members contactable with the turning target and a force sensor configured to, via the contact members, detect a force in a pressing direction and a torque about an axis orthogonal to the pressing direction, the force and the torque acting from the turning processing device on the turning target, are attached.

4 Claims, 6 Drawing Sheets

(56) References Cited

U.S. PATENT DOCUMENTS

| | | | | |
|---|---|---|---|---|
| 2023/0088695 | A1* | 3/2023 | Maurer | B23Q 17/006 279/60 |
| 2024/0139830 | A1* | 5/2024 | Stangl | B23B 31/16279 |

FOREIGN PATENT DOCUMENTS

| | | | | | |
|---|---|---|---|---|---|
| DE | 102018122027 | A1 | * | 3/2020 | B23Q 3/06 |
| DE | 102021107493 | A1 | * | 9/2022 | B23B 31/28 |
| EP | 2923784 | A1 | * | 9/2015 | B23Q 17/005 |
| JP | H06323352 | A | | 11/1994 | |
| JP | 2004-92812 | A | | 3/2004 | |
| JP | 2022-70011 | A | | 5/2022 | |
| KR | 20010058714 | A | * | 7/2001 | B23Q 3/082 |
| KR | 100761197 | B1 | * | 9/2007 | B23B 13/12 |
| KR | 102527344 | B1 | * | 5/2023 | B23B 25/06 |

* cited by examiner

MOUNTING DEVICE, MOUNTING METHOD, AND METHOD FOR MANUFACTURING PRODUCT

This Nonprovisional application claims priority under 35 U.S.C. § 119 on Patent Application No. 2023-170381 filed in Japan on Sep. 29, 2023, the entire contents of which are hereby incorporated by reference.

TECHNICAL FIELD

The present invention relates to a mounting device and a mounting method, each of which is for mounting a turning target to a turning processing device, and a method for manufacturing a product.

BACKGROUND ART

In various types of machining, a chuck configured to hold a workpiece which is a target to be processed. For example, Patent Literature 1 discloses a retaining force sensor configured to measure a holding force (retaining force) of a chuck configured to hold a workpiece. The retaining force sensor disclosed in Patent Literature 1 includes a strain element (including, for example, a large-diameter bent-plate portion and a small-diameter bent-plate portion) cantilevered on one side of a base portion thereof. When the chuck holds these bent-plate portions, a strain gauge attached to the strain element undergoes a strain, so that the retaining force sensor detects a retaining force (holding force).

In manufacture of disc brake plates, it is known that chucks of turning processing devices hold disc brake plates which are in turn subjected to turning processes. It is also known that in this case, use of tools for causing the chucks of the turning processing devices to hold the disc brake plates (for loading the disc brake plates to the chucks) automates the turning processes to efficiently manufacture the disc brake plates.

The disc brake plate is a disc-shaped structure that is also called "disc rotor". The disc brake plate and a brake caliper makes up a disc brake. For example, Patent Literature 2 discloses a configuration in which a disc brake configured to generate a braking force by driving a linear-motion member with use of an actuator to press a brake pad (brake caliper) against a disc rotor includes a pressing force sensor that receives the pressing force generated between the linear-motion member and the brake pad and outputs an analog value corresponding to the pressing force.

CITATION LIST

Patent Literature

[Patent Literature 1]
Japanese Patent Application Publication Tokukai No. 2022-70011
[Patent Literature 2]
Japanese Patent Application Publication Tokukai No. 2004-92812

SUMMARY OF INVENTION

Technical Problem

The turning processing device as described above can, when a target to be turned is properly held (is subjected to a proper chucking) with respect to the turning processing device, carry out a desired turning process for the turning target. However, a configuration has not been known which makes it possible to, prior to a turning process, detect whether or not a turning target is properly held with respect to a turning processing device.

It is an object of an aspect of the present invention to achieve a mounting device, a mounting method, and a product manufacturing method, each of which makes it possible to, prior to a turning process, detect whether or not a turning target is properly held with respect to the turning processing device.

Solution to Problem

In order to solve the foregoing problem, a mounting device in accordance with an aspect of the present invention is a mounting device configured to mount a turning target to a turning processing device, the mounting device including a pressing jig configured to press the turning target against the turning processing device, wherein to the pressing jig, contact members contactable with the turning target and a force sensor configured to, via the contact members, detect a force in a pressing direction and a torque about an axis orthogonal to the pressing direction, the force and the torque acting from the turning processing device on the turning target, are attached.

In order to solve the foregoing problem, a mounting method in accordance with an aspect of the present invention is a method for mounting a turning target to a turning processing device, the method including the steps of: pressing the turning target against the turning processing device; and detecting, after the pressing, a force in a pressing direction and a torque about an axis orthogonal to the pressing direction with use of a force sensor, the force and the torque acting from the turning processing device on the turning target.

In order to solve the foregoing problem, a product manufacturing method in accordance with an aspect of the present invention includes the step of, through the above mounting method, mounting the turning target which is a base material of a product to the turning processing device.

Advantageous Effects of Invention

According to an aspect of the present invention, it is possible to achieve a mounting device, a mounting method, and a product manufacturing method, each of which makes it possible to, prior to a turning process, detect whether or not a turning target is properly held with respect to the turning processing device.

DESCRIPTION OF EMBODIMENTS

<Configuration of Mounting Device>

Figure 1:
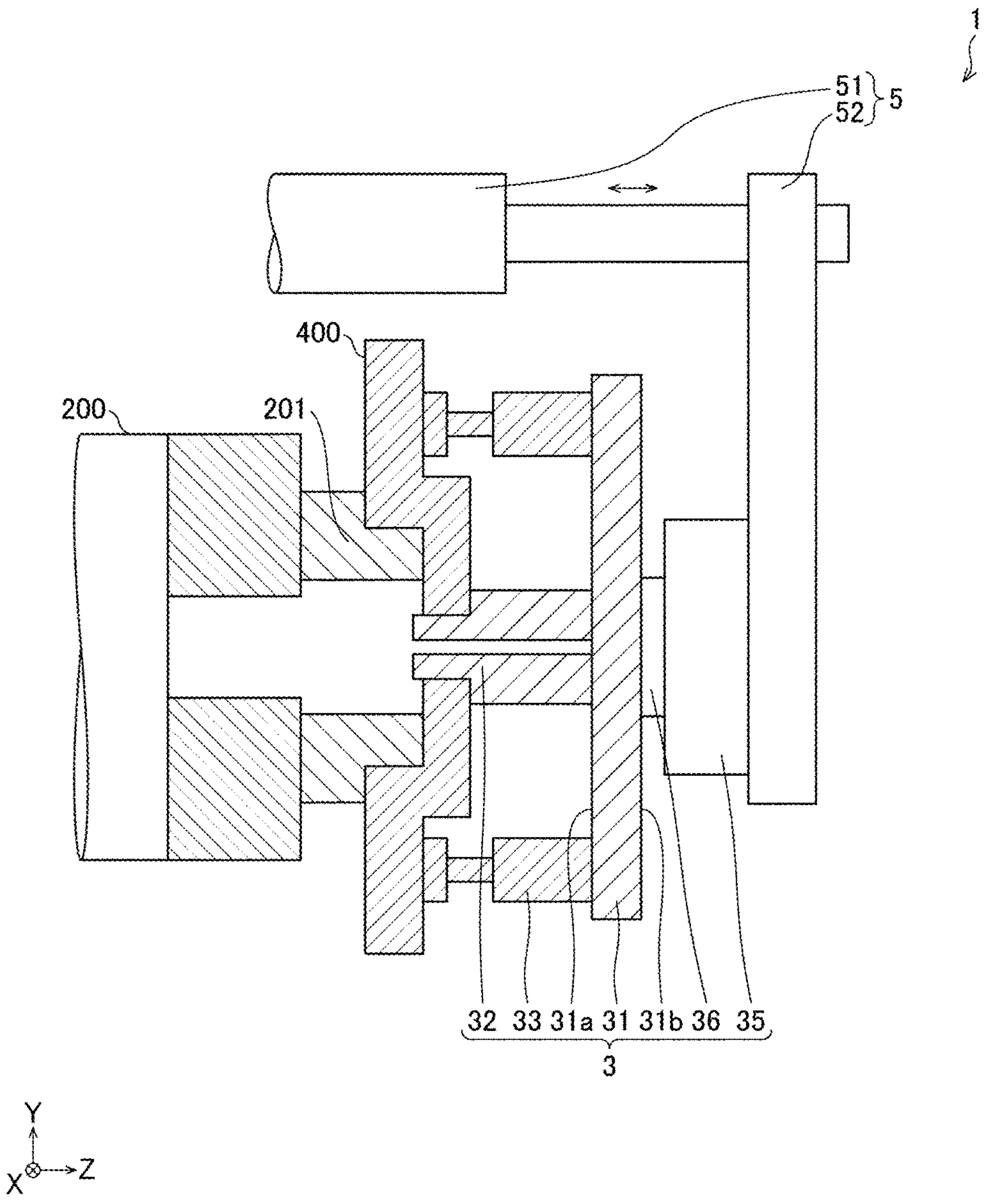
FIG. 1 is a cross-sectional view illustrating a mounting device in accordance with an embodiment of the present invention.
Figure 2:
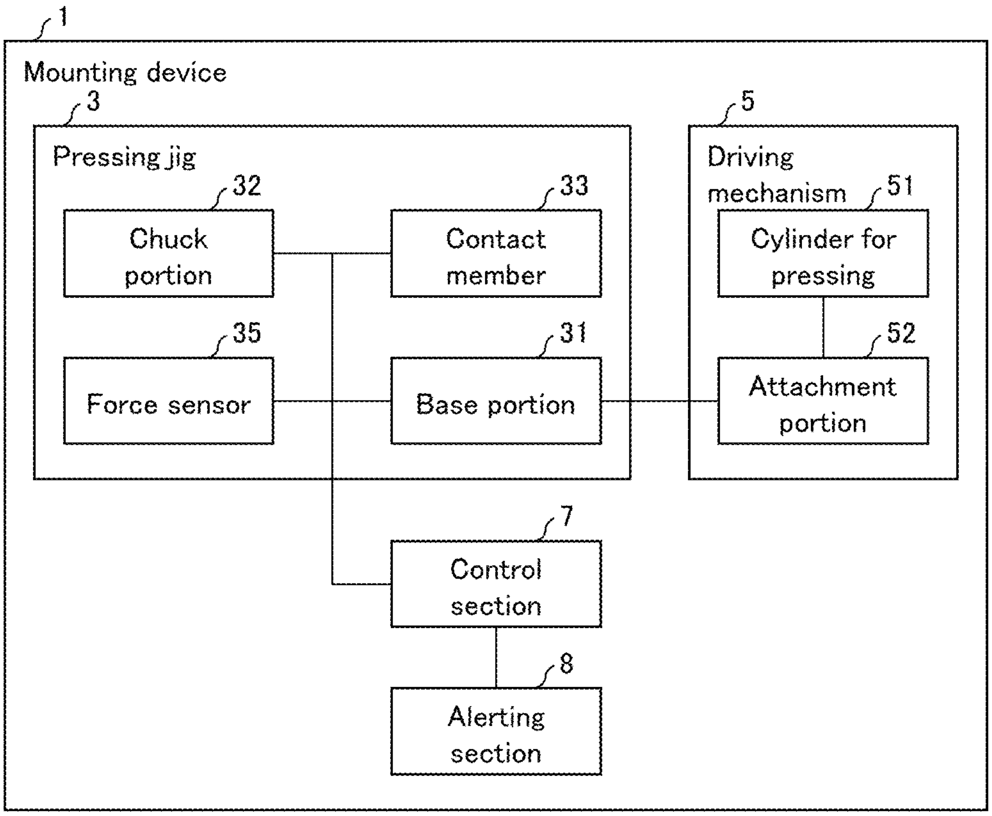
FIG. 2 is a block diagram illustrating a configuration of the mounting device illustrated in FIG. 1.
Figure 3:
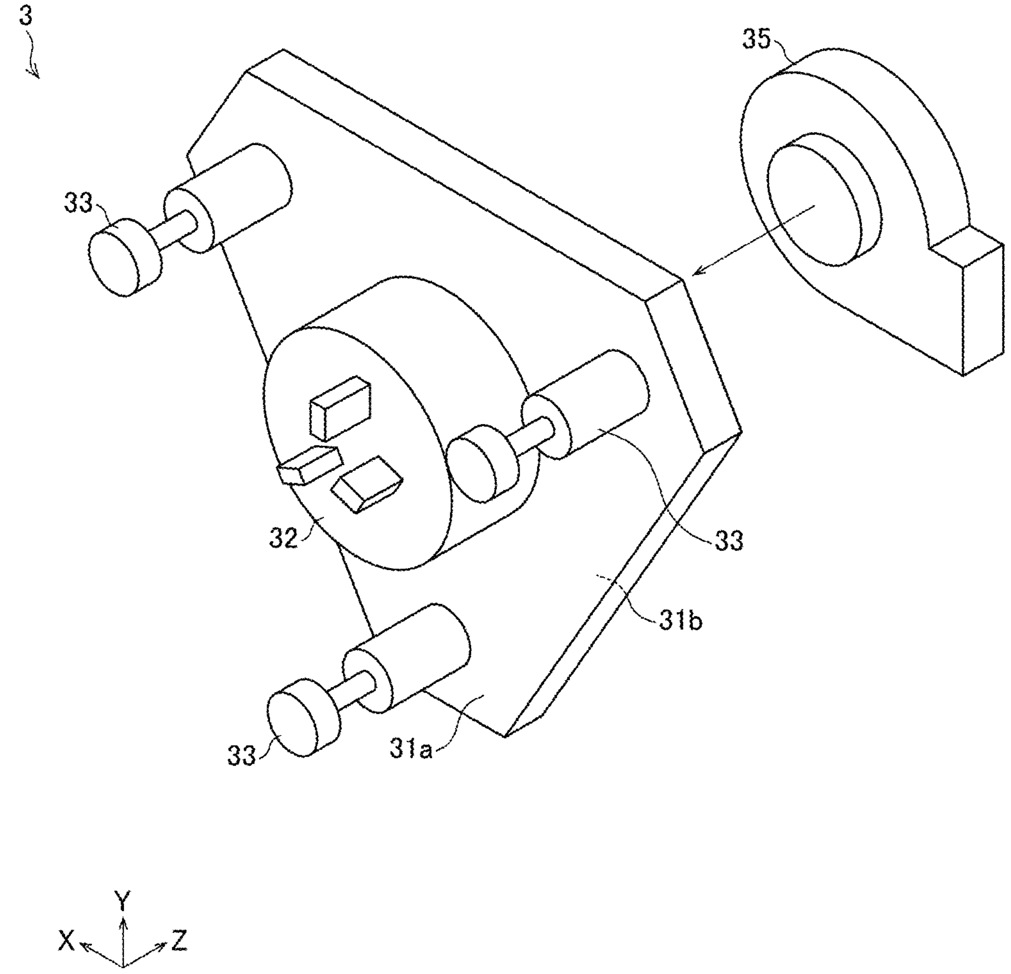
FIG. 3 is a partial exploded side view illustrating a pressing jig included in the mounting device illustrated in FIG. 1.

With reference to FIGS. 1 to 3, the following description will discuss a mounting device 1 in accordance with an embodiment of the present invention. FIG. 1 is a cross-sectional view illustrating the mounting device 1. FIG. 2 is a block diagram illustrating a configuration of the mounting device 1. FIG. 3 is a partial side view illustrating the mounting device 1. For simplification of description, in FIG. 1, some of the components are illustrated as a cross-sectional view. Further, for simplification of description, FIG. 3 illustrates a force sensor 35 in a separate state.

The mounting device 1 is a mounting device used for mounting a turning target 400 to a turning processing device 200. Here, the turning target 400 is, for example, a disc-shaped structure which is a base material of a disc brake plate and which has not yet been subjected to a turning process, and is a disc-shaped casting having a draft angle. The turning target 400 can be also expressed as a disc brake plate prior to a turning process. However, the turning target 400 is not limited to the disc brake plate prior to a turning process.

The mounting device 1 includes a pressing jig 3 and a driving mechanism 5 configured to drive the pressing jig 3. The driving mechanism 5 includes a cylinder 51 for pressing and an attachment portion 52 to which the pressing jig 3 is attached. The cylinder 51 for pressing moves the attachment portion 52 in a uniaxial direction. In the present embodiment, this uniaxial direction is defined as a Z axis. Also drawings show XYZ three-dimensional coordinate systems in which X-axis and Y-axis directions are defined with a plane perpendicular to the Z axis set as a XY-plane.

The pressing jig 3 presses the turning target 400 against the turning processing device 200. The pressing jig 3 is attached to a surface, on a Z-axis negative direction side, of the attachment portion 52 of the driving mechanism 5. The pressing jig 3 is configured to, in accordance with movement of the attachment portion 52 in a Z-axis negative direction, move in the Z-axis negative direction and approach the turning processing device 200 provided further on the Z-axis negative direction side than the pressing jig 3.

The turning processing device 200 includes a chuck 201 on a Z-axis positive direction side. The chuck 201 is, for example, a three-jaw chuck. The chuck 201 can detachably hold (carry out chucking of) the turning target 400 from a Z-axis positive direction side. Although the mechanism of the chuck 201, which may be a chuck included in a well-known turning processing device, is not specifically described here, the chuck 201 is configured to hold the turning target 400 in a state in which the turning target 400 is pressed against the turning processing device 200 by the pressing jig 3. At the timing when the chuck 201 holds the turning target 400, the pressing jig 3 releases the holding of the turning target 400, as described later.

The driving mechanism 5 causes the pressing jig 3 that has released the holding of the turning target 400 to move in a direction away from the turning processing device 200 (toward the Z-axis positive direction side). This is an outline of the movement of the pressing jig 3. The following will describe the configuration of the pressing jig 3.

<Configuration of Pressing Jig>

The pressing jig 3 includes a base portion 31, a chuck portion 32, contact members 33, and a force sensor 35.

The base portion 31 is a flat plate-shaped structure extending in a direction orthogonal to a pressing direction (Z-axis direction). In an example illustrated in FIG. 3, the base portion 31 is made up from a triangle flat plate. The base portion 31 has a first main surface 31*a* which is a main surface facing the turning target 400 and a second main surface 31*b* which is a main surface located opposite to the first main surface 31*a*.

The chuck portion 32 is attached to the first main surface 31*a* and has the center axis parallel to the Z axis. The chuck portion 32 has an end portion which is located on the Z-axis positive direction side and which is fixed to the first main surface 31*a*, and is configured to hold (carry out chucking of) a turning target with use of an end portion thereof on the Z-axis negative direction side. FIG. 3 illustrates, as an example, the end portion of the chuck portion 32 on the Z-axis negative direction side. As illustrated in FIG. 3, the chuck portion 32 may be a three-jaw chuck as in the case of the above-described chuck 201 of the turning processing device 200. The chuck portion 32 holds a predetermined chucking area of the turning target 400, and causes the jaws of the three-jaw chuck to move toward the center axis when releasing the holding. Note that the chuck portion 32 is not limited to this aspect. In a case where, for example, the turning target 400 is a disc brake plate, the predetermined chucking area is a through hole provided at the center portion and having a draft angle in the disc-shaped disc brake plate.

The contact members 33 are bar-shaped structures attached to the first main surface 31*a* of the base portion 31 and extending along a pressing direction. The plurality of contact members 33 are provided at regular intervals along an imaginary circle including the chuck portion 32 as the center of the imaginary circle. In an example illustrated in FIG. 3, the three contact members 33 are provided around the chuck portion 32, and an imaginary line connecting the three contact members 33 forms a regular triangle. The chuck portion 32 is provided at the center of gravity of the imaginary regular triangle. Note that the number of the contact members 33 is only required to be two or more.

The end portions of the contact member 33 on the Z-axis positive direction side are fixed to the first main surface 31*a*, and the end portions thereof on the Z-axis negative direction side are contactable with the turning target 400. Specifically, the end portions of the contact members 33 on the Z-axis negative direction side are contactable with a surface, on the Z-axis positive direction side, of the turning target 400 pressed against the turning processing device 200 in the Z-axis negative direction. The contact members 33 have the same length. The contact members 33 transmit, to the base portion 31, a pressing force in the Z-axis positive direction which is received from the turning target 400 through the contact.

The force sensor 35 is attached on a second main surface 31*b* side of the base portion 31. The force sensor 35 detects, via the contact members 33, a force in a pressing direction and a torque about an axis orthogonal to the pressing direction, the force and the torque acting from the turning processing device 200 on the turning target 400. The force sensor 35 is provided so as to be positioned on a back side of an area at which the chuck portion 32 is provided. On the second main surface 31*b* side of the base portion 31, the force sensor 35 is fixed to the second main surface 31*b* via a member 36 for connection. To the attachment portion 52, a frame portion 112 of the force sensor 35 is connected.

Figure 4:
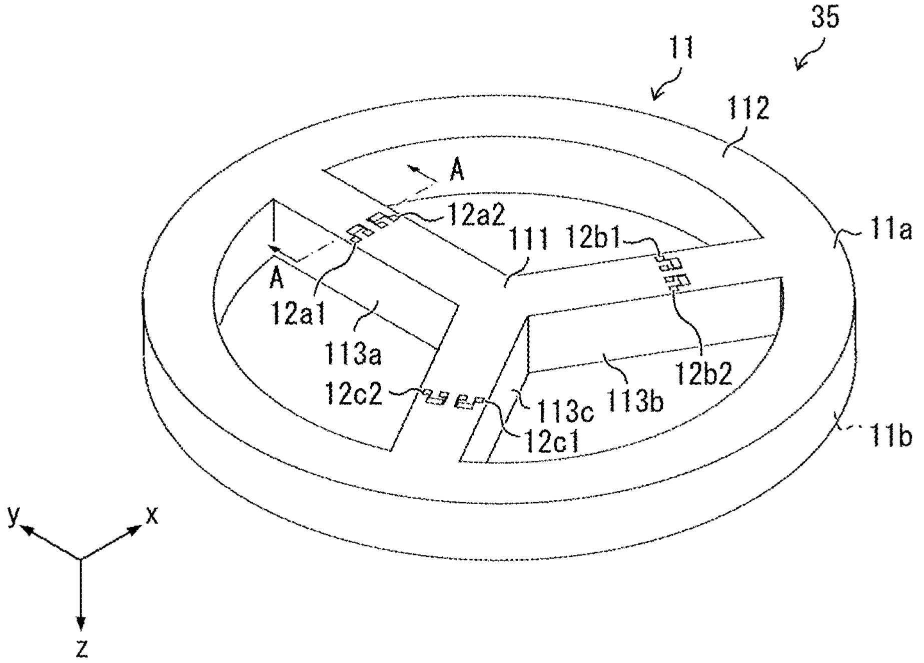
FIG. 4 is a perspective view illustrating a force sensor included in the mounting device illustrated in FIG. 1.

The force sensor 35 is a six-axis force sensor but may be alternatively a three-axis force sensor. With reference to FIG. 4, the following will describe the force sensor 35 which is a six-axis force sensor.

FIG. 4 is a perspective view illustrating the force sensor 35 which is a six-axis force sensor. As illustrated in FIG. 4, the force sensor 35 includes a strain element 11 and a strain gauge group consisting of six strain gauges 12*a*1, 12*a*2, 12*b*1, 12*b*2, 12*c*1, and 12*c*2. Here, the six-axis force sensor refers to a force sensor capable of detecting the following components of an external force: an X-axis direction component, a Y-axis direction component, a Z-axis direction component, a moment component about the X-axis, a moment component about the Y-axis, and a moment component about the Z-axis. Note that the strain element 11 is disposed so that two main surfaces of the strain element 11 are in parallel with the XY-plane. One of the paired main surfaces of the strain element 11 which is on the Z-axis negative direction side is called a main surface 11*a*, and the other of the paired main surfaces of the strain element 11 which is on the Z-axis positive direction side is called a main surface 11*b*.

Note that the force sensor 35 is one example and may be another existing force sensor. For example, to the configuration of the force sensor, also the force sensor described in FIG. 1 and FIG. 2 of Japanese Patent Application Publication Tokukai No. 2020-165898 (Tokugan 2019-068598) is applicable.

The force sensor 35 includes, in addition to the strain element 11 and the strain gauges 12*a*1, 12*a*2, 12*b*1, 12*b*2, 12*c*1, and 12*c*2, a plurality of resistor elements and a plurality of bridge circuits. However, the description in the present embodiment will discuss the strain element 11 and the strain gauges 12*a*1, 12*a*2, 12*b*1, 12*b*2, 12*c*1, and 12*c*2, and does not discuss the plurality of resistor elements and the plurality of bridge circuits. Configurations of the plurality of resistor elements and the plurality of bridge circuits may be as those of existing force sensors (e.g., the force sensor shown in FIG. 1 and FIG. 2 of Japanese Patent Application Publication Tokukai No. 2020-165898).

The strain element 11 is a plate-shaped member made of a material with a spring property. As shown in FIG. 4, the strain element 11 includes a core portion 111, a frame portion 112 surrounding the core portion 111, and arm portions 113*a* to 113*c* via which the core portion 111 and the frame portion 112 are connected to each other. A material of which the strain element 11 is made may be (i) an electric conductor such as an aluminum alloy, an alloy steel, or a stainless steel or (ii) a dielectric such as a ceramic material, a resin, or glass, for example. In the present embodiment, the strain element 11 is made of a ceramic material, which is one example of the dielectric.

A method for forming the strain element 11 may be, for example, machining of a base material that is a single plate-shaped member having a uniform thickness. The machining may be cutting, for example. The cutting is preferably numerical controlled (NC) machining. Note that, if external force is exerted on the core portion 111 while the frame portion 112 is in a fixed state, the arm portions 113*a* to 113*c* undergo a strain that varies in accordance with that external force. Therefore, the core portion 111 may be referred to as "force receiver", and the frame portion 112 may be referred to as "fixing portion".

In the force sensor 35, the main surface 11*a* on the Z-axis negative direction side which is one main surface of the paired main surfaces of the strain element 11 faces the second main surface 31*b* of the base portion 31 illustrated in FIG. 1 (with the member 36 for connection interposed therebetween). The force sensor 35 is configured such that while the frame portion 112 thereof is in a fixed state to the second main surface 31*b* of the base portion 31 via the member 36 for connection, an external force applied via the contact members 33, the base part 31, and the connection member 36, that is, a force acting from the turning processing device 200 on the turning target 400, acts on the core portion 111. The force sensor 35 detects the following components of this force: an X-axis direction component, a Y-axis direction component, and a Z-axis direction component. These correspond to a "force in a pressing direction acting from the turning processing device 200 on the turning target 400", which is detected by the force sensor 35. In addition, the force sensor 35 detects the following components of this force: a moment component about an X axis, a moment component about a Y axis, and a moment component about a Z axis. These correspond to a "torque about an axis orthogonal to a pressing direction", which is detected by the force sensor 35.

There is no particular limitation on the shape of the core portion 111. In the present embodiment, the core portion 111 is in the shape of a pole with a substantially triangle base (i.e., substantially in the shape of a triangular pole). There is no particular limitation on the shape of the frame portion 112, as well. In the present embodiment, the frame portion 112 is in the shape of a ring. The frame portion 112 has an outer peripheral portion and an inner peripheral portion that have a substantially circular shape and that are concentric to each other. As described above, the strain element 11 is formed by machining a single base material having a uniform thickness. Thus, a thickness of the core portion 111 is substantially equal (in the present embodiment, equal) to a thickness of the frame portion 112. The core portion 111 is disposed inside the inner peripheral portion of the frame portion 112 such that a center of gravity of the core portion 111 coincides with a center of the frame portion 112 which is in the shape of a ring.

In the present embodiment, the arm portions 113*a* to 113*c* are each in the shape of a pole having a substantially quadrangular cross-section and extending along one direction (i.e., substantially in the shape of a quadrangular pole). There is no limitation on the number of arm portions 113*a* to 113*c*. In the present embodiment, the number of arm portions 113*a* to 113*c* is three. The arm portion 113*a* extends from the core portion 111 in the Y-axis positive direction so as to connect the core portion 111 with the frame portion 112. The arm portion 113*b* extends, in the XY-plane, from the core portion 111 in a direction at an angle of −120° relative to the Y-axis negative direction (i.e., at an angle of 120° clockwise from the y-axis negative direction) so as to connect the core portion 111 with the frame portion 112. The arm portion 113*c* extends, in the XY-plane, from the core portion 111 in a direction at an angle of +120° relative to the Y-axis negative direction (i.e., at an angle of 120° counterclockwise from the Y-axis negative direction) so as to connect the core portion 111 with the frame portion 112.

Note that the shapes of the core portion 111, the frame portion 112, and the arm portions 113*a* to 113*c* are not limited to the above-described shapes. For example, the core portion 111, the frame portion 112, and the arm portions 113*a* to 113*c* may have the shapes as shown in FIG. 1 of Japanese Patent Application Publication Tokukai No. 2020-165898.

The mounting device 1 further includes a control section 7, as illustrated in FIG. 2. The control section 7 controls the components of the pressing jig 3. Further, the control section 7 acquires an output signal from the force sensor 35. The control section 7 acquires a signal indicative of a force in a pressing direction and a torque about an axis orthogonal to the pressing direction, the force and the torque acting from the turning processing device 200 on the turning target 400 and being detected by the force sensor 35. Specifically, the control section 7 uses a threshold to detect whether the turning target 400 abuts on the chuck 201 of the turning processing device 200 (a force in a pressing direction), on the basis of the acquired signal. Further, the control section 7 sets a threshold for a value of the moment and refers to the acquired signal to, in a case where the value of the moment is equal to or greater than the threshold, identify that the turning target 400 is inclined.

Here, the "inclination" of the turning target in the present specification refers to inclination of the turning target pressed: the turning processing device, with respect to the turning target that is assumed to be properly held by the turning processing device. The expression "being properly held" means that the turning processing device can carry out a desired turning process for a turning target. For example, assume that a state in which the center axis of a turning target held by the turning processing device is parallel to a vertical direction is defined as "being properly held". In this case, when the center axis of the turning target is inclined with respect to an axis along a vertical direction, the turning target is regarded as being inclined. As another example, assume that a state in which the center axis of a turning target held by a turning processing device is on a horizontal plane is defined as "being properly held". In this case, when the center axis of the turning target is inclined with respect to the horizontal plane, the turning target is regarded as being inclined. The turning target is inclined with respect to the turning processing device for various reasons. Examples of the reasons include a defect of the mounting device 1, in particular, a defect of the holding by the chuck portion 32 of the pressing jig 3. Further, one cause of the holding defect may be a structural defect of the turning target itself. Examples of the structural defect of the turning target itself include an inconvenient deformation and shift in the center of gravity. In addition, in a case where the turning target is a disc-shaped casting and is a base material of the disc brake plate, a defect due to casting is included.

Note that the control section 7 can also control holding by the chuck portion 32 and releasing of the holding. In addition, the control section 7 may control the driving mechanism 5. In an example illustrated in FIG. 2, the single control section 7 is present, but it is also possible that control sections are each provided for corresponding control over the component.

As illustrated in FIG. 2, the mounting device 1 further includes an alerting section 8. The alerting section 8 outputs a predetermined signal in a case where at least one of a force in a pressing direction and a torque about an axis orthogonal to the pressing direction, the force and the torque having been detected by the force sensor 35, has a value exceeding a predetermined numeral range. In other words, the alerting section 8 outputs a predetermined signal in a case where the inclination of the turning target 400 exceeds an allowable range. The alerting section 8 can acquire a signal indicative of inclination of the turning target 400 from the control section 7. Note that the control section 7 identifies whether or not the value has exceeded the predetermined numeral range.

As an alerting method carried out by the alerting section 8, a well-known alerting method can be employed. In a case where the alerting section 8 includes a sound output device, an alert by sound is possible. In a case where the alerting section 8 includes a light-emitting device, an alert by light is possible. As another example of the alerting method carried out by the alerting section 8, in a case where the alerting section 8 includes a display device, an aspect is possible in which an image indicating that a value exceeding a predetermined numeral range has been detected is displayed on a display screen of the display device. This will be described with reference to FIG. 5 and FIG. 6.

Figure 5:
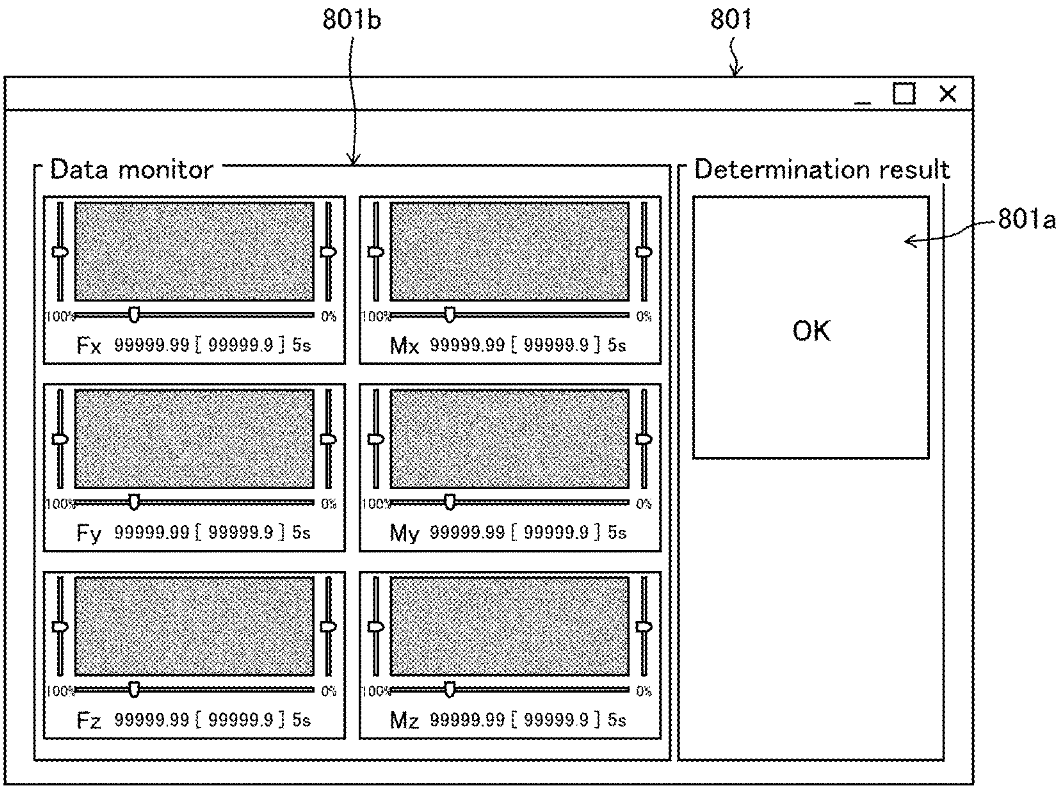
FIG. 5 is a view illustrating an example of notification of a result of determination by the mounting device illustrated in FIG. 1.
Figure 6:
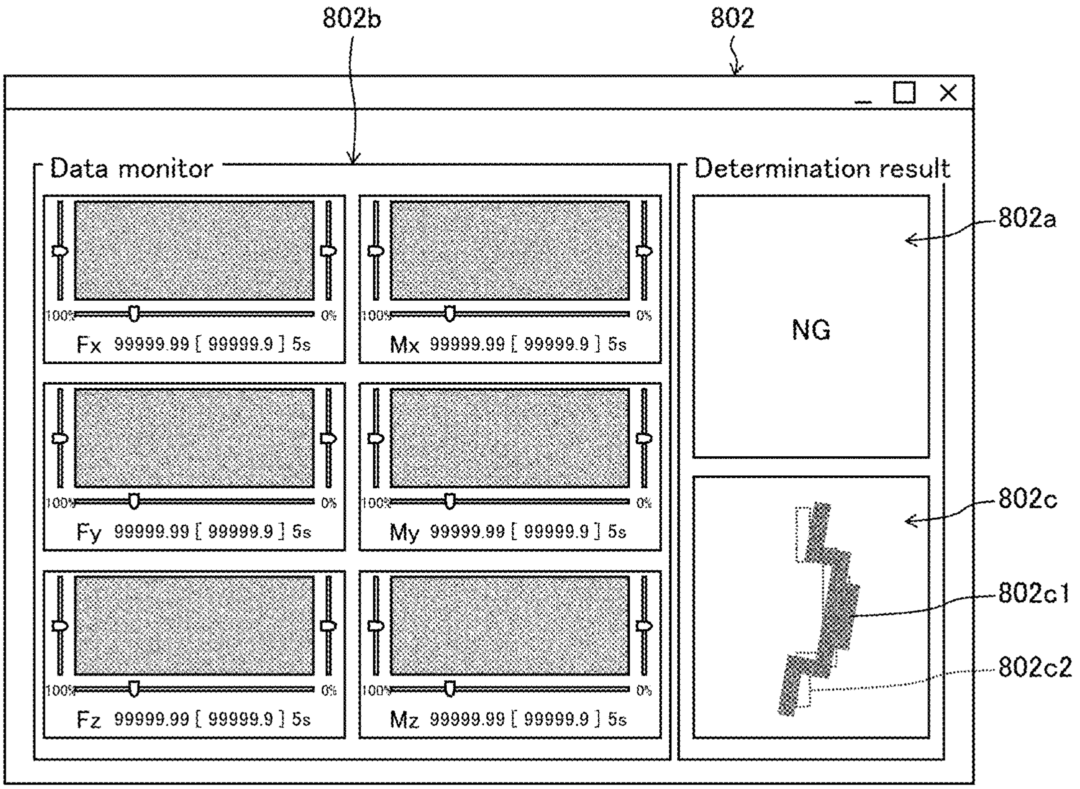
FIG. 6 is a view illustrating an example of notification of a result of determination by the mounting device illustrated in FIG. 1.

FIG. 5 and FIG. 6 are respectively an example of an image 801 (illustrated in FIG. 5) and an example of an image 802 (illustrated in FIG. 6), the two images being displayed on the display screen of the display device included in the alerting section 8. The image 801 illustrated in FIG. 5 includes an image 801*a* displayed in a case where a force in a pressing direction and a torque about an axis orthogonal to the pressing direction, the force and the torque having been detected by the force sensor 35, fall within respective predetermined numerical ranges set in advance. In an example illustrated in FIG. 5, the word "OK" is displayed on the image 801*a*. That is, this image 801 (image 801*a*) indicates that inclination of the turning target 400 falls within an allowable range (in the present embodiment, that no inclination of the turning target 400 is found). Note that as illustrated in a left side of the screen in the image 801, measurement data 801*b* obtained by the force sensor 35 may be displayed.

The image 802 illustrated in FIG. 6 includes an image 802*a* displayed in a case where at least one of a force in a pressing direction and a torque about an axis orthogonal to the pressing direction, the force and the torque having been detected by the force sensor 35, has exceeded a predetermined numerical range. In an example illustrated in FIG. 6, the word "NG" is displayed on the image 802*a*. That is, this image 802 (image 802*a*) indicates that inclination of the turning target 400 has exceeded an allowable range (in the present embodiment, that inclination of the turning target 400 is found). Note that as in the case of the image 801 illustrated in FIG. 5, the image 802 may also display measurement data 802*b* obtained by the force sensor 35, as illustrated on a left side of the screen. In an example illustrated in FIG. 6, an illustration 802*c* that enables visual comparison between the current turning target 400 in an inclined state and a model turning target not in an inclined state is shown in the screen below the image 802*a*. In the illustration 802*c*, an illustration 802*c*1 showing the current turning target 400 in an inclined state and an illustration 802*c*2 showing the model turning target not in an inclined state are overlapped. Here, the identified inclination is reflected in the illustration 802*c*1 showing the current turning target 400 in an inclined state.

Note that display devices configured to display the above-described images may be provided also to a management room located apart from the turning process site, as well as to the turning process site.

As described above, the mounting device 1 in accordance with the present embodiment makes it possible to, through detection by the force sensor 35, identify that the turning target 400 is held in an inclined state with respect to the turning processing device 200. This makes it possible to contribute to enabling the turning target 400 held without inclination with respect to the turning processing device 200 to be subjected to a turning processing step. This makes it possible to reduce occurrence of a failure in a turned product. Further, it is possible to identify that the turning target 400 is held in an inclined state by the turning processing device 200 and thus to pause a subsequent turning process. This makes it possible to avoid a risk that the turning target 400 which is being held in an inclined state by the turning processing device 200 is subjected to a subsequent turning process and is inconveniently detached from the turning processing device 200 during a turning process and flies away.

The configuration of including the plurality of contact members 33 which are brought into contact with the turning target 400 at a plurality of areas as described above is employed. Therefore, in a case where the turning target 400 is inclined, the pressing jig 3 (base portion 31) is inclined via the contact member 33. This enables the force sensor 35 on a rear side thereof to detect the inclination of the turning target 400.

Further, the configuration of including the alerting section 8 and having an alerting function as described above enables a worker in a turning process site to be informed of occurrence of inclination of the turning target 400.

Note that the pressing jig 3 described in the present embodiment is applicable to a well-known mounting device for loading a turning target to a turning processing device. Further, the control section 7 and the alerting section 8 may be components of the pressing jig 3.

<Mounting Method>

Figure 7:
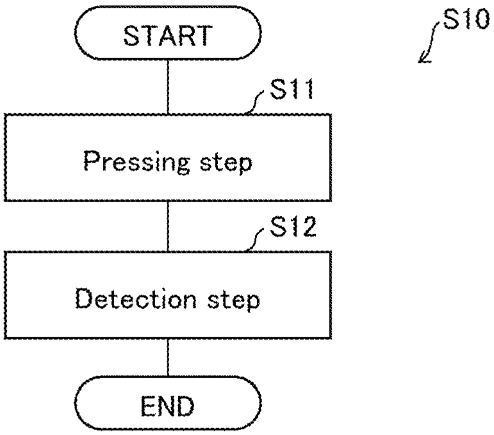
FIG. 7 is a flowchart for explaining the processing steps of a mounting method in accordance with an embodiment of the present invention.

With reference to FIG. 7, the following description will discuss a method for mounting the turning target 400 to the turning processing device 200, in accordance with the present embodiment. FIG. 7 is a flowchart illustrating the processes of the mounting method for the turning target 400. The mounting method (S10) for mounting a turning target to a turning processing device includes a pressing step (S11) and a detection step (S12).

The pressing step S11 is a step of pressing the turning target 400 against the turning processing device 200. The above-described driving mechanism 5 drives, in the Z-axis negative direction, the pressing jig 3 holding the turning target 400 with use of the chuck portion 32, so that the pressing step S11 is carried out.

Note that the turning processing device 200 and the pressing jig 3 are aligned in advance. Specifically, the alignment is made so that the center axis of the chuck 201 of the turning processing device 200 and the center axis of the chuck portion 32 of the pressing jig 3 are positioned on the same axis (an axis parallel to the Z axis). The alignment may be made in a state in which the chuck portion 32 of the pressing jig 3 does not hold the turning target or may be made in a state in which the chuck portion 32 holds the turning target.

The pressing step S11 ends at the timing when the chuck portion 32 of the pressing jig 3 has released holding of the turning target 400. Note that immediately before the chuck portion 32 of the pressing jig 3 releases the holding, the chuck 201 of the turning processing device 200 has completed holding the turning target 400.

The detection step S12 is carried out after the pressing step S11. In the detection step S12, a force in a pressing direction and a torque about an axis orthogonal to the pressing direction, the force and the torque acting from the turning processing device 200 on the turning target 400, are detected with use of the force sensor 35.

In the detection step S12, the detection of the force in the pressing direction and the torque about the axis orthogonal to the pressing direction by the force sensor 35 makes it possible to identify whether or not the turning target 400 is inclined. With regard to the detection by the force sensor 35, which is described above, in the detection step S12, the force sensor 35 detects the following components of a force in a pressing direction: an X-axis direction component, a Y-axis direction component, a Z-axis direction component, a moment component about an X axis, a moment component about a Y axis, and a moment component about a Z axis, and the control section 7 acquires the detection results as an output signal and identifies inclination of the turning target 400. Note that the detection step S12 may include an alerting step carried out by the above-described alerting section 8 (see FIG. 2).

The above mounting method (S10) makes it possible to, through detection by the force sensor 35, identify that the turning target 400 is held in an inclined state with respect to the turning processing device 200. This makes it possible to contribute to enabling the turning target 400 held without inclination with respect to the turning processing device 200 to be subjected to a subsequent turning processing step. This makes it possible to reduce occurrence of a failure in a turned product.

Note that the present embodiment describes the mounting method carried out with use of the mounting device 1, but a mounting method in accordance with the present invention may be an aspect of using a well-known mounting device to detect, with use of a force sensor, a force in a pressing direction and a torque about an axis orthogonal to the pressing direction, the force and the torque acting from a turning processing device on a turning target.

<Method for Manufacturing Product>

Figure 8:
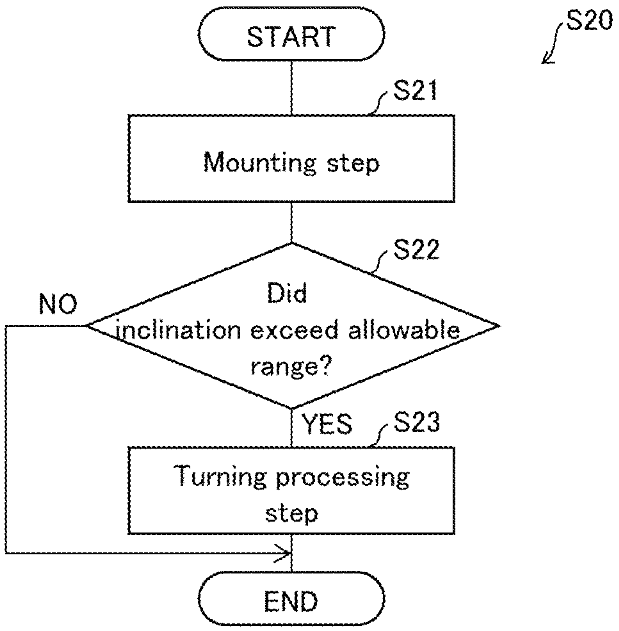
FIG. 8 is a flowchart for explaining the processing steps of a product manufacturing method in accordance with an embodiment of the present invention.

The above method for mounting a turning target to a turning processing device can be incorporated into a method for manufacturing a product, as a step of mounting a turning target which is a base material of the product to the turning processing device. With reference to FIG. 8, the following will describe an aspect of the method for manufacturing a product. FIG. 8 is a flowchart illustrating the processes of a product manufacturing method in accordance with the present embodiment. As illustrated in FIG. 8, the product manufacturing method (S20) includes a mounting step (S21), a determination step (S22), and a turning processing step (S23).

The mounting step S21 includes the pressing step S11 and the detection step S12 subsequent to the pressing step S11 which are described in FIG. 7 as above.

In the determination step S22, it is determined whether inclination of a turning target identified on the basis of the force in a pressing direction and the torque about an axis orthogonal to the pressing direction, the force and the torque acting from a turning processing device on the turning target and having been detected by the force sensor 35 in the detection step S12, has exceeded an allowable range. The determination step S22 is carried out by the control section 7. In a case where the inclination of the turning target has exceeded the allowable range as a result of the determination, the process proceeds to “NO” in FIG. 8. In this case, the turning process is not carried out (the turning processing step is not carried out). In the case where the inclination has exceeded the allowable range, a predetermined signal may be outputted. In contrast, in a case where the inclination of the turning target falls within the allowable range (in the present embodiment, no inclination of the turning target 400 is found) as a result of the determination, the process proceeds to “YES” in FIG. 8 and proceeds to the turning processing step S23. In the turning processing step S23, a turning process is carried out for the turning target 400 held without inclination with respect to the turning processing device 200, so that a product is completed. Note that the turning process, which may be a well-known turning process, is not described here.

According to the above product manufacturing method S20, a turning target is held without inclination with respect to a turning processing device, and thus it is possible to manufacture a product having been subjected to an accurate turning process.

Further, in the above manufacturing method S20, an unprecedented step of, based on a detection result from the force sensor 35, identifying whether or not a turning target is inclined is added to the process of mounting the turning target to a turning processing device. Conventionally, even a turning target mounted to a turning processing device in an inclined state is, in some cases, subjected to a turning process as it is, and is disposed of as a defective product in a subsequent manufacturing process. However, according to the configuration of the present embodiment, it is possible to, in a phase before a turning process is carried out, identify a turning target mounted in an inclined state to a turning processing device. This makes it possible to properly mount the identified turning target to the turning processing device through a certain method and makes it possible to reduce the number of turning targets disposed of as defective products to be smaller than the conventional one. For example, such an effect contributes to achievement of Goal 9 “Build resilient infrastructure, promote inclusive and sustainable industrialization and foster innovation” of Sustainable Development Goals (SDGs) proposed by the United Nations.

Aspects of the present invention can also be expressed as follows:

A mounting device in accordance with Aspect 1 of the present invention is a mounting device configured to mount a turning target to a turning processing device, the mounting device including a pressing jig configured to press the turning target against the turning processing device, wherein to the pressing jig, contact members contactable with the turning target and a force sensor configured to, via the contact members, detect a force in a pressing direction and a torque about an axis orthogonal to the pressing direction, the force and the torque acting from the turning processing device on the turning target, are attached.

According to the configuration of Aspect 1 above, it is possible to, through detection by the force sensor, identify that the turning target is held in an inclined state with respect to the turning processing device. This makes it possible to contribute to enabling the turning target held without inclination with respect to the turning processing device to be subjected to a turning processing step. This makes it possible to reduce occurrence of a failure in a turned product. Further, it is possible to identify that the turning target is held in an inclined state by the turning processing device and thus to pause a subsequent turning process. This makes it possible to avoid a risk that the turning target which is being held in an inclined state by the turning processing device is subjected to a subsequent turning process and is inconveniently detached from the turning processing device during a turning process and flies away.

A mounting device in accordance with Aspect 2 of the present invention is configured, in addition to the configuration of the mounting device in accordance with Aspect 1 above, such that the pressing jig includes: a flat plate-shaped base portion extending in a direction orthogonal to the pressing direction; and a chuck portion configured to hold the turning target, the chuck portion being attached to a first main surface which is a main surface on a side to which the contact members are attached, among two main surfaces of the base portion, the force sensor is attached on a side closer to a second main surface which is a main surface located opposite to the first main surface, among the two main surfaces of the base portion, and the contact members are bar-shaped structures extending along the pressing direction and are provided at regular intervals along an imaginary circle including the chuck portion as a center of the imaginary circle.

According to the configuration of Aspect 2 above, the contact members are configured to be brought into contact with the turning target at a plurality of areas. In a case were the turning target is inclined, the pressing jig is inclined via the contact members. This enables the force sensor on a rear side thereof to detect the inclination of the turning target.

A mounting device in accordance with Aspect 3 of the present invention is configured, in addition to the configuration of the mounting device in accordance with Aspect 1 or 2 above, to further includes an alerting section configured to output a predetermined signal in a case where at least one of the force in the pressing direction and the torque about the axis orthogonal to the pressing direction, the force and the torque having been detected by the force sensor, has a value exceeding a predetermined numerical range.

The configuration of Aspect 3 above has an alerting function and thus enables a worker in a turning process site to be informed of occurrence of inclination of the turning target.

A mounting device in accordance with Aspect 4 of the present invention is configured, in addition to the configuration of the mounting device in accordance with any one of Aspects 1 to 3 above, such that the turning target is a disc-shaped casting having a draft angle.

In the configuration of Aspect 4 above, in a case of the disc-shaped casting having a draft angle, the casting may be inclined due to a slight shift when subjected to chucking at the area thereof in which the draft angle is provided, by a chucking target device. Examples of a disc-shaped casting include a disc brake plate. When such a disc-shaped casting having a draft angle is subjected to chucking, use of a mounting device in accordance with an aspect of the present invention makes it possible to identify the presence or absence of inclination and carry out a turning process for only a casting (turning target) being subjected to chucking without inclination.

In order to solve the foregoing problem, a mounting method in accordance with Aspect 5 of the present invention is a method for mounting a turning target to a turning processing device, the method including the steps of: pressing the turning target against the turning processing device; and detecting, after the pressing, a force in a pressing direction and a torque about an axis orthogonal to the pressing direction with use of a force sensor, the force and the torque acting from the turning processing device on the turning target.

According to the configuration of Aspect 5 above, it is possible to, through detection by the force sensor, identify that the turning target is held in an inclined state with respect to the turning processing device. This makes it possible to contribute to enabling the turning target held without inclination with respect to the turning processing device to be subjected to a turning processing step. This makes it possible to reduce occurrence of a failure in a turned product. Further, it is possible to identify that the turning target is held in an inclined state by the turning processing device and thus to pause a subsequent turning process. This makes it possible to avoid a risk that the turning target which is being held in an inclined state by the turning processing device is subjected to a subsequent turning process and is inconveniently detached from the turning processing device during a turning process and flies away.

In order to solve the foregoing problem, a product manufacturing method in accordance with Aspect 6 of the present invention includes the step of, through the mounting method in accordance with Aspect 5 above, mounting the turning target which is a base material of a product to the turning processing device.

According to the configuration of Aspect 6 above, the turning target is subjected to chucking without inclination with respect to the turning processing device, and thus it is possible to manufacture a product having been subjected to an accurate turning process.

A product manufacturing method in accordance with Aspect 7 of the present invention is configured, in addition to the configuration of the product manufacturing method in accordance with Aspect 6 above, such that the product is a disc brake plate.

ADDITIONAL REMARKS

The present invention is not limited to the embodiments, but can be altered by a skilled person in the art within the scope of the claims. The present invention also encompasses, in its technical scope, any embodiment derived by combining technical means disclosed in differing embodiments.

The invention claimed is:

1. A mounting device configured to mount a turning target to a turning processing device, the mounting device comprising:

a pressing jig configured to press the turning target against the turning processing device; and a driving mechanism configured to drive the pressing fig, wherein to the pressing jig, a chuck portion configured to hold the turning target, contact members contactable with the turning target, and a force sensor configured to, via the contact members, detect a force in a pressing direction and a torque about an axis orthogonal to the pressing direction, the force and the torque acting from the turning processing device on the turning target, and a flat plate-shaped base portion extending in a direction orthogonal to the pressing direction, are attached, the flat plate-shaped base portion includes:

a first main surface which is a surface extending in the direction orthogonal to the pressing direction; and a second main surface which is a surface extending in the direction orthogonal to the pressing direction and which is located on a back side of the first main surface, the chuck portion and the contact members are attached to the first main surface, the force sensor is attached on a side closer to the second main surface, the force sensor is attached to the driving mechanism, and the force sensor is located between the flat plate-shaped base portion and the driving mechanism.

2. The mounting device according to claim 1, wherein the contact members are bar-shaped structures extending along the pressing direction and are provided at regular intervals along an imaginary circle including the chuck portion as a center of the imaginary circle, and the chuck portion is configured to chuck a through hole provided at a center portion of the turning target.

3. The mounting device according to claim 1, further comprising an alerting section configured to output a predetermined signal to notify that at least one of the force in the pressing direction and the torque about the axis orthogonal to the pressing direction, the force and the torque having been detected by the force sensor, has exceeded a predetermined numerical range.

4. The mounting device according to claim 2, wherein the force sensor is a six-axis force sensor or a three-axis force sensor that is located on a back side of a position where the chuck portion is disposed, with the flat plate-shaped base portion interposed between the force sensor and the chuck portion.

* * * * *